Nov. 5, 1946.　　　　G. T. WAIT　　　　2,410,537
HEATING APPARATUS
Filed Nov. 26, 1943　　　2 Sheets-Sheet 1

Inventor
George T. Wait
By Williams, Bradbury Hinkle
Attorneys

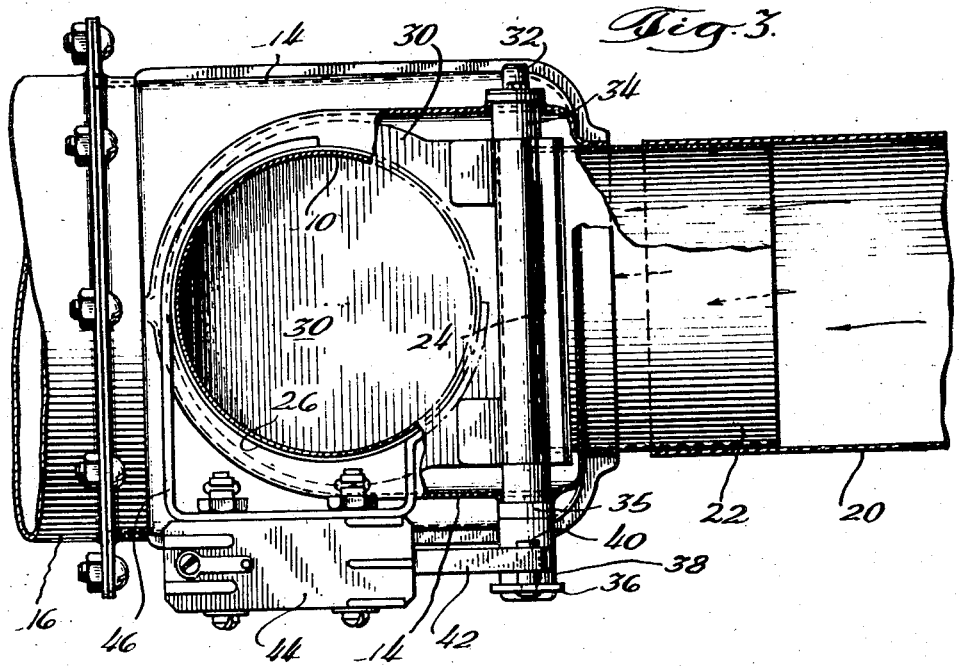
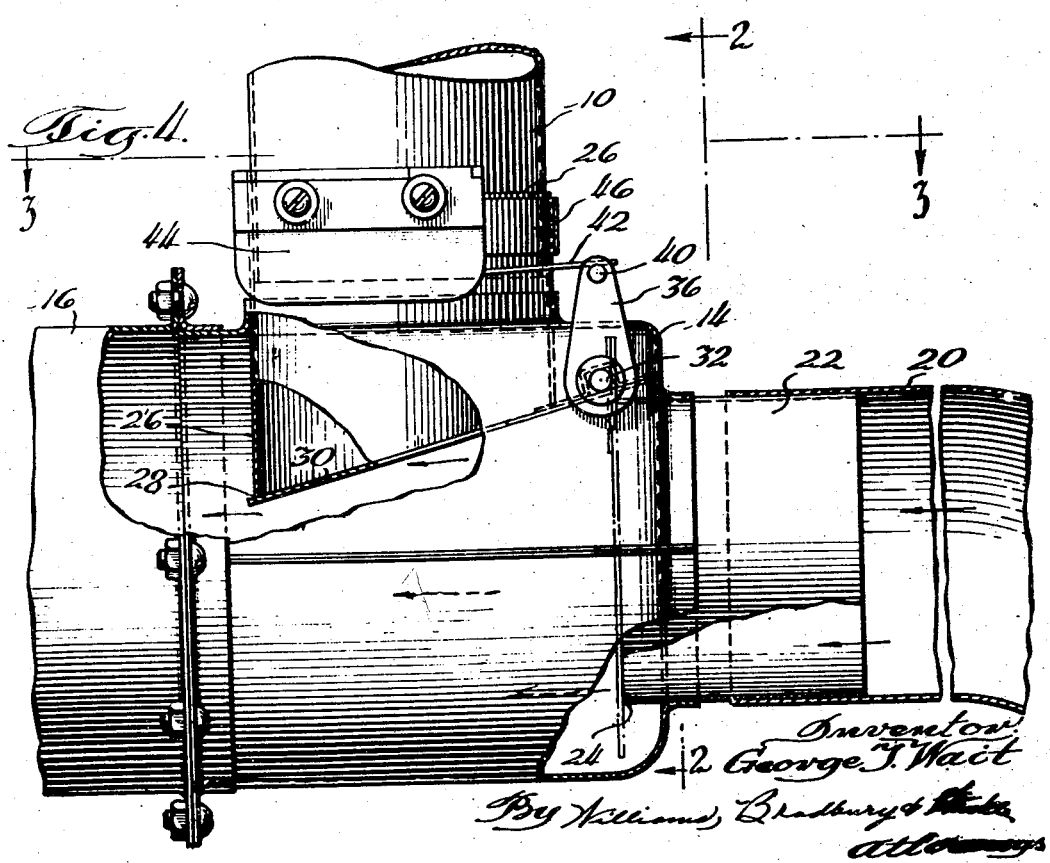

Patented Nov. 5, 1946

2,410,537

UNITED STATES PATENT OFFICE 2,410,537

HEATING APPARATUS

George T. Wait, Chicago, Ill., assignor to Stewart-Warner Corporation, Chicago, Ill., a corporation of Virginia Application November 26, 1943, Serial No. 511,767

8 Claims. (Cl. 126—110)

My invention relates generally to heating apparatus, and more particularly to aircraft heating systems employing a ram and a blower to secure flow of the air for combustion or ventilating air, or both.

Heating systems for aircraft may be conveniently supplied with air under pressure by use of a scoop or ram projecting beyond the skin of the aircraft, but under certain circumstances the ram or scoop does not supply sufficient pressure to secure satisfactory operation of the heater. For example, when the airplane is on the ground being warmed up, it is frequently desirable to heat the cabin preliminary to take-off, and unless the scoop or ram is advantageously located with respect to the propeller slip stream, the ram or scoop will be ineffective to supply air under pressure for operation of the heater. Furthermore, even when in flight, the ram or scoop may not provide adequate air pressure, as, for example, in the execution of a dive by a dive bomber, and it is therefore desirable to provide some auxiliary means for supplying air under pressure for heater operation at such times that the ram or scoop pressure is insufficient.

It is thus an object of my invention to provide an improved aircraft heating system in which is incorporated means for automatically supplying air under pressure for heater operation by means of a blower whenever the ram or scoop pressure is insufficient for satisfactory heater operation.

A further object is to provide an improved switch operating mechanism, operable in response to the difference in pressure between the air entering the ram or scoop and that supplied by the blower.

Other objects will appear from the following description, reference being had to the accompanying drawings, in which Fig. 1 is a diagrammatic elevational view, partly in section, showing an aircraft heating system embodying the invention;

Fig. 3 is a horizontal sectional view taken on the line 3—3 of Fig. 4; and

Fig. 4 is a side elevational view with portions of the valve body and conduit broken away to show the internal construction.

Figure 1:
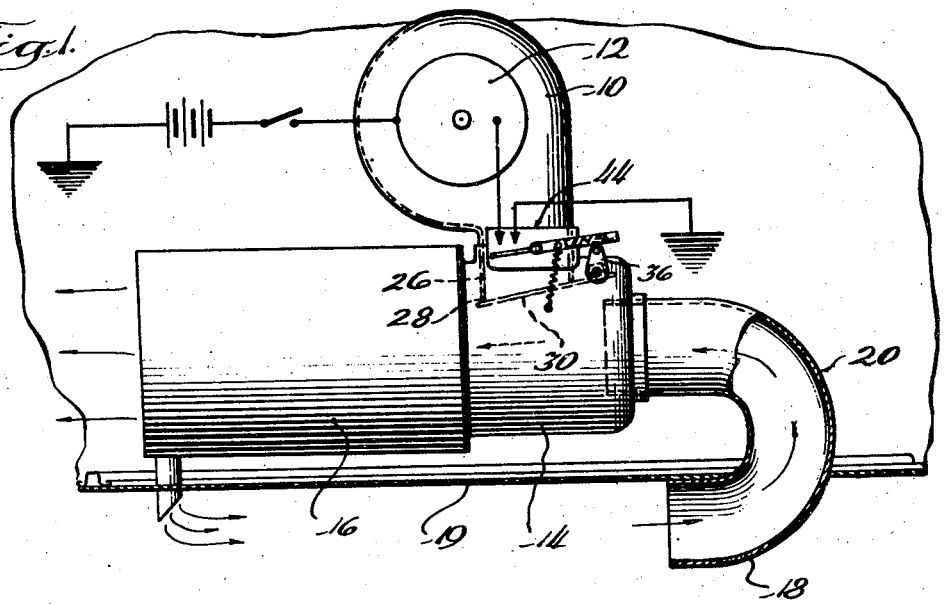

The invention may be utilized in heating systems in which two separate blowers driven by a common motor are utilized, respectively, to supply air for combustion and for ventilation, in which two separate motor driven blowers are provided respectively for these purposes, or in which a single motor driven blower is utilized for supplying both the ventilating air and the air for combustion. A system of the latter type is diagrammatically illustrated in Fig. 1 as comprising a blower 10 driven by a motor 12 supplying combustion air and ventilating air to a housing 14 secured to the inlet end of a heater 16. An air ram or scoop 18, projecting through the airplane skin 19 into the airstream, is connected to the housing 14 by a conduit 20.

Figure 2:
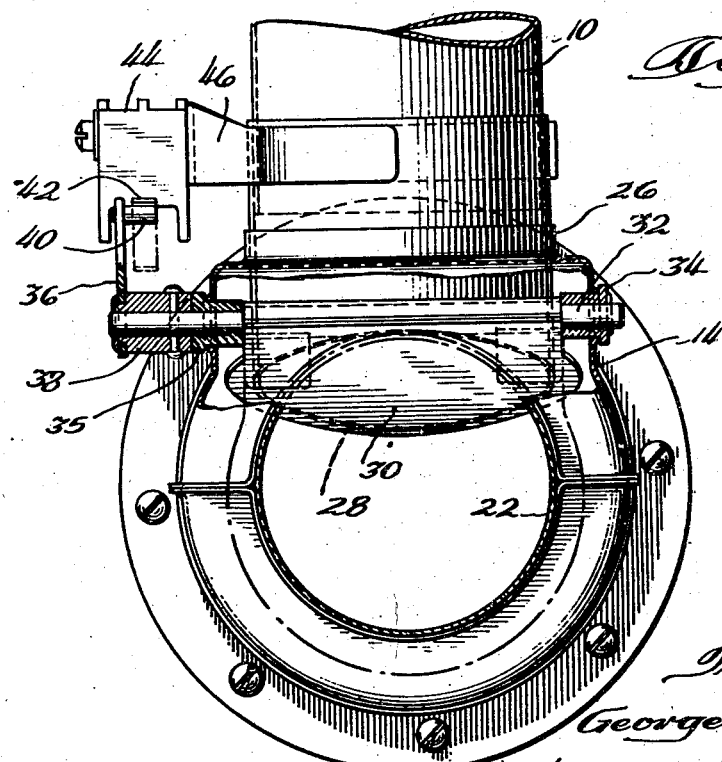
Fig. 2 is a sectional view of the switch operating mechanism, taken generally on the line 2—2 of Fig. 4.

As best shown in Figs. 2, 3, and 4, the conduit 20 is connected to the housing 14 by a coupling section 22, the end of which projects a substantial distance into the housing 14, and forms a valve seat 24. The casing of the blower 10 is similarly connected to a coupling section 26, which projects into the housing 14 a substantial distance and the inner end of which is cut at an angle to provide a sloping valve seat 28. A damper or flap valve 30 is secured to a square shaft 32, the ends of which are cylindrical and project through bearings 34 and 35. The latter may be welded or otherwise suitably secured to the housing 14. An arm 36 is peened to a sleeve 38 which is pinned to the shaft 34. The free end of the arm 36 has a sidewardly projecting pin 40 cooperable with a leaf spring actuator 42 forming part of a microswitch 44 of conventional construction.

The switch 44 operates in such manner that it is open when the arm 36 is in its upright position, as shown in Fig. 4, and closed when the arm swings about 45° counterclockwise from this position. In Fig. 1, for purposes of simplicity, it is assumed that the micro-switch is directly in the energizing circuit for the blower motor 12, although in actual practice the micro-switch 44 will usually operate a relay in the energizing circuit for the motor 12. The micro-switch 44 is secured to a bracket 46 which may be welded or otherwise suitably secured to the coupling section 26.

If the apparatus is to be mounted in a horizontal position, as illustrated, gravity may be relied upon to swing the flap valve 30 from its full line position to its dotted line position (Fig. 4), although ordinarily the force of gravity will preferably be supplemented by a light spring, the tension of which may be adjusted to secure proper operation of the flap valve in the particular position in which the apparatus is installed.

In operation, with the plane on the ground and the scoop 18 providing insufficient pressure for the operation of the heater, the flap valve 30 will swing downwardly, thereby closing the microswitch and causing operation of the blower 10. The pressure of the air supplied by the blower will force the damper valve 30 against its seat 24. The heater will thus be operated, using the air supplied by the blower, until the airplane takes off and attains normal flying speed. As this occurs, the pressure in the scoop 18 will build up to a value sufficient to swing the flap valve 30 from its dotted line position to its full line position (Fig. 4), whereupon the pin 40 on the arm 36 will engage the leaf spring 42, and through the latter operate the micro-switch 44 to open the energizing circuit for the motor 12.

The heater will then continue in operation, utilizing the air supplied by the scoop, until such time as the airplane reduces its speed, as in a dive bombing dive. Under these circumstances, the dynamic air pressure available from the scoop 18 may be insufficient to maintain the flap valve 30 in its full line position, and the valve will swing downwardly under the influence of gravity with or without the additional pull of a spring, thereby moving the pin 40 away from the leaf spring 42 and permitting the operation of the micro-switch 44 to effect reenergization of the blower motor 12.

Due to the fact that the seat 28 for the valve 30 is at an angle, the air flowing through the housing 14 from the scoop 18 will tend to hold the valve against this seat and prevent fluttering thereof. Reverse flow through the coupling section 26 to the blower 10 is thus precluded.

As previously indicated, the housing 14 and mechanism associated therewith may be utilized in the combustion air supply line and be utilized to control the operation of a single blower supplying both combustion and ventilating air, or to control the operation of two blowers respectively supplying combustion air and ventilating air. It is desirable, in order to prevent overheating of the heater, to cause the ventilating air to be supplied by the blower instead of the ram or scoop whenever the combustion air is supplied by its blower.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In an aircraft heating system having a heater of the sealed combustion type, and having a scoop or ram and a blower for supplying air to the heater, the combination of a housing connected to said scoop or ram, to the outlet of said blower and to the inlet of said heater, a member having a range of movement and movable toward one limit of its range in response to the pressure of the air flowing from said scoop or ram and yieldably biased in the opposite direction, and a control device actuated by said movable member and operative to stop and start the blower, said control device being so actuated for starting the blower when the pressure from the scoop or ram falls below a predetermined value and permits said member to move in said opposite direction.

2. In the combination defined in claim 1, said movable member comprising a valve mounted in the housing in position to close the connection between the scoop or ram and said housing at the other limit of its range of movement.

3. In the combination defined in claim 1, said control device being actuated by said movable member to stop the blower when the pressure of the air flowing from the scoop or ram rises above a predetermined value and said member responds to said pressure by movement toward said one limit of its range and beyond a predetermined point.

4. In the combination defined in claim 1, said movable member comprising a valve mounted in the housing in position to close the connection between the blower and said housing at said one limit of its movement and being moved toward said limit by the pressure from the scoop or ram when said pressure rises above a predetermined value.

5. In an aircraft heating system having a heater of the sealed combustion type, and having a scoop or ram and a blower for supplying air to the heater, the combination of a housing connected to said scoop or ram, to the outlet of said blower, and to the inlet of said heater, a valve member pivotally pendant in said housing for swinging movement through a limited range therein, said member closing the connection between the scoop or ram and the housing at the lower limit of its range and closing the connection between the blower and the housing at the upper limit of its range and being swingable from said lower limit toward said upper limit by the dynamic pressure of air flowing from the scoop or ram, and a control device actuated by said valve member and operative to stop and start the blower, said control device being so actuated for starting the blower by movement of said valve member below a predetermined position in its range and being actuated for stopping the blower by movement of said valve member above a predetermined position in said range.

6. In the combination defined in claim 5, said valve member extending obliquely into the path of air flowing from the scoop or ram to the heater when said valve is positioned at its upper limit closing the connection from the blower to the housing.

7. In an aircraft heating system having a heater of the sealed combustion type and having a scoop or ram and a blower for supplying air to the heater, the combination of a housing having an outlet connected to the heater and having a pair of inlets, one connected to the outlet of the blower and the other connected to the scoop or ram, valve means mounted in said housing and movable to one position closing the inlet from the blower and to another position closing the inlet from the ram, said valve being responsive to the pressure of the air from the ram and movable thereby to its position for closing the inlet from the blower, a motor connected to drive said blower, a control switch for said motor, means biasing said switch to closed position and means operable by the movement of the valve means to open said switch when the ram pressure rises above a predetermined value.

8. In an aircraft heating system having a heater of the sealed combustion type, and having a scoop or ram and a blower for supplying air to the heater, the combination of a housing having an outlet connected to the heater and having a pair of inlets, one connected to the outlet of the blower and the other connected to the scoop or ram, a motor connected to drive said blower, a control switch for said motor, and means to actuate said switch including valve means mounted in said housing and movable to one position closing the inlet from the blower and to another position closing the inlet from the ram, said valve being responsive to the pressure of the air from the ram and movable thereby to its position for closing the inlet from the blower, said valve operating to open said switch when the valve reaches a predetermined position in said movement to close the inlet from the blower.

GEORGE T. WAIT.

Disclaimer 2,410,537.—*George T. Wait*, Chicago, Ill. HEATING APPARATUS. Patent dated Nov. 5, 1946. Disclaimer filed July 8, 1948, by the assignee, *Stewart-Warner Corporation*.

Hereby enters this disclaimer to claims 1 and 3 in said specification.

[*Official Gazette August 17, 1948.*]